324-77

02-08-72 XR 3,641,438 SR

United States Patent [15] 3,641,438

Canty [45] Feb. 8, 1972

[54] WIDEBAND RECEIVER

[72] Inventor: Eugene T. Canty, Santa Barbara, Calif.

[73] Assignee: International Telephone and Telegraph Corporation, Nutley, N.J.

[22] Filed: Jan. 20, 1966

[21] Appl. No.: 522,808

[52] U.S. Cl. ....................325/332, 324/77 C, 324/79 R, 325/305, 325/307, 325/335, 325/367, 325/430

[51] Int. Cl. ....................H04b 1/36

[58] Field of Search....................324/79, 77 C, 77 E; 325/3, 325/307, 332, 430, 462, 432

[56] References Cited

UNITED STATES PATENTS 2,603,745 7/1952 McCouch ....................325/333

2,926,304 2/1960 Fromm ....................324/79

2,955,199 10/1960 Minder ....................325/307 X

*Primary Examiner*—Rodney D. Bennett, Jr.

*Assistant Examiner*—Richard E. Berger

*Attorney*—C. Cornell Remsen, Jr., Rayson P. Morris, Percy P. Lantzy, Philip M. Bolton and Isidore Togut

[57] ABSTRACT

A plurality of preamplifiers divide a wideband frequency range into a plurality of different, contiguous frequency regions. A frequency translator is coupled to the preamplifiers to translate the frequency regions to the frequency region of one of the preamplifiers. An arrangement is coupled to the frequency translator to recover intelligence, or to determine the frequency of the signal, contained in the wideband frequency range.

10 Claims, 3 Drawing Figures

INVENTOR.
EUGENE T. CANTY
BY Alfred C Hill
AGENT

INVENTOR.
EUGENE T. CANTY

BY Alfred C. Hill

AGENT

WIDEBAND RECEIVER

This invention relates to radio receivers and more particularly to wideband radio receivers capable of being employed with intelligence reception and frequency measurement systems.

Wideband radio receivers find particular usefulness in communication systems, such as satellite communication systems, and frequency measurement systems where the input signal to the receiver has a frequency within a wideband of frequencies, for instance, 0 to 12 kilomegacycles (kmc.). In the past, wideband receivers have incorporated tuned circuits to subdivide the wide frequency range of the front end of the receiver into a plurality of different, contiguous frequency regions to enhance the initial reception of the signal. A separate mixer and swept frequency oscillator arrangement is coupled to the output of each tuned circuit so that as the swept frequency oscillator is swept through its frequency range an output from a particular one of the mixers is produced dependent upon the frequency region the received signal is located in. Thus, for each frequency region a mixer and a swept frequency oscillator is required to receive the signal.

An object of this invention is to provide a wideband receiver with the least amount of equipment for use in an intelligence receiver, or a frequency measuring system.

Another object of this invention is to provide a wideband receiver for compatible reception of pulsed and continuous wave signals employing the least amount of equipment.

A feature of this invention is the provision of a wideband receiver having a given frequency range for reception of either pulse or continuous wave signals disposed therein comprising a first means to divide the given frequency range into a plurality of different, contiguous frequency regions and a second means coupled to the first means to frequency translate the frequency regions into a common frequency band. An intelligence detection system or frequency measuring system may then be coupled to the second means to recover the intelligence conveyed by the received signal or to determine the frequency of the received signal.

Another feature of this invention is the provision of a wideband receiver having the given frequency range divided into three different, contiguous frequency ranges comprising first means including a first amplifier responsive to the signals in the higher one of the frequency regions, a second amplifier responsive to signals in the lower one of the frequency regions, and a third amplifier responsive to the signals in the intermediate one of the frequency regions, and second means including a mixer and lower sideband selector coupled to the first amplifier, a mixer and upper sideband selector coupled to the second amplifier, and a local oscillator common to both mixers to frequency translate the higher one of the frequency regions and the lower one of the frequency regions to the intermediate one of the frequency regions.

Still another feature of this invention is the incorporation of additional equipment in the second means cooperating with the above-mentioned components comprising third and fourth mixers coupled in common to the first and second mixers and the third amplifier, a plurality of oscillatory signals coupled to each of the third and fourth mixers to beat with the signals present in the intermediate one of the frequency regions to provide two other frequency bands different from each other and the intermediate one of the frequency regions, fifth and sixth mixers coupled respectively to the output of the third and fourth mixers, and a swept frequency oscillator coupled in common to the fifth and sixth mixer to produce at the output of the fifth and sixth mixers a common intermediate frequency signal. Continuous wave intelligence demodulators or continuous wave demodulate frequency measuring arrangements are coupled to the outputs of the fifth and sixth mixers. Contiguous bandpass filters are coupled to the third and fourth mixers having pass bands contiguous one to the other and consistent with the different frequency bands at the output of the third and fourth mixers to provide appropriate passage of a pulse signal for either intelligence demodulation of frequency measurement.

The above-mentioned and other features and objects of this invention will become more apparent by reference to the following description taken in conjunction with the accompanying drawings, in which.

The following description of the drawings incorporates therein different frequency values at different points in the receiver embodiments. It is to be understood that these frequency values are not to be construed to limit the scope of this invention but are merely for purposes of explanation.

Figure 1:
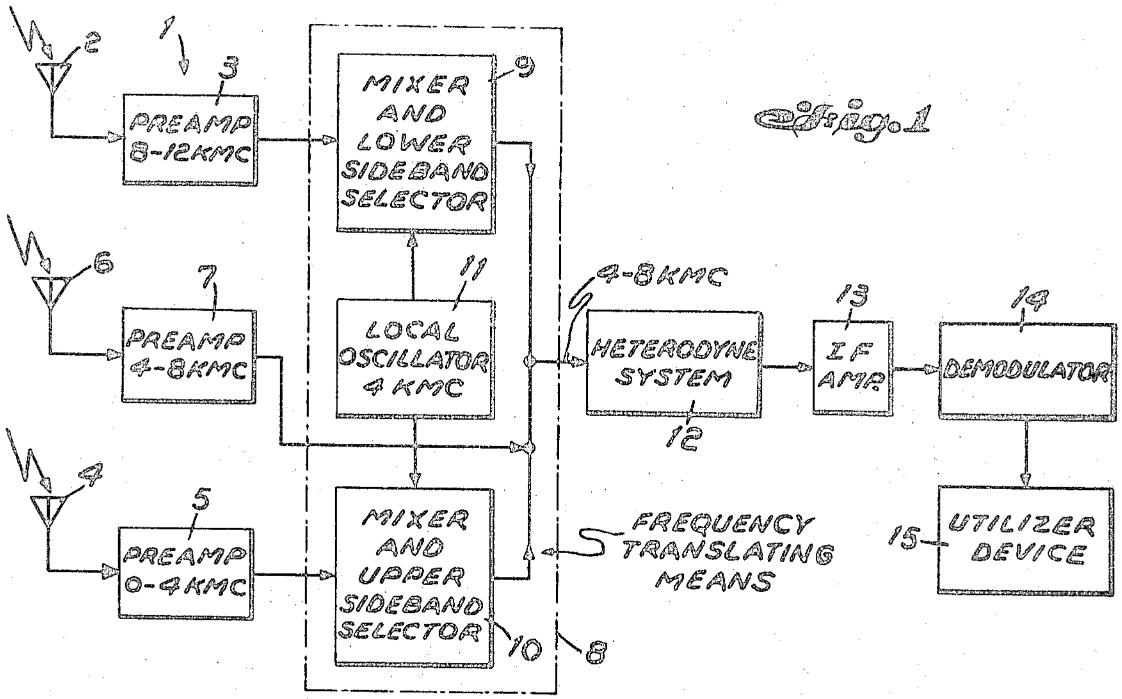
FIG. 1 is a block diagram of a wideband receiver in accordance with the principles of this invention.

FIG. 1 discloses a wideband receiver having a given frequency range for reception of signals disposed therein, such as a frequency range of 0 to 12 kmc. A first means 1 divides the given frequency range into a plurality of different, contiguous frequency regions. Means 1 for purposes of explanation, is shown as dividing the given frequency range into three contiguous frequency regions. Antenna 2 and preamplifier 3 respond to the upper frequency region of 8 to 12 kmc., antenna 4 and preamplifier 5 respond to the lower frequency region of 0 to 4 kmc., antenna 6 and preamplifier 7 respond to the intermediate frequency region of 4 to 8 kmc. The preamplifiers 3, 5 and 7 can be low noise traveling wave tubes.

The output of preamplifiers 3, 5 and 7 are coupled to a frequency translating or second means 8 including therein a direct connection between the preamplifier 7 and the output of means 8. The output of preamplifier 3 is coupled to mixer and lower sideband selector 9 and the output of preamplifier 5 is coupled to mixer and upper sideband selector 10. Mixers 9 and 10 are coupled in common to local oscillator 11 generating an oscillatory signal having a frequency of 4 kmc. As in the case of all mixers, an upper sideband and lower sideband are produced in mixer 9 by the mixing of the local oscillator signal of oscillator 11 and a signal having a frequency in the frequency range of preamplifier 3. By selecting the lower sideband there is produced a difference signal in the frequency range of 4 to 8 kmc. Thus, through this action the upper frequency region has been translated to the same frequency region assigned to preamplifier 7. In mixer 10 the 4-kmc. output of oscillator 11 is mixed with the output of preamplifier 5 and the upper sideband is selected. Hence, the frequency range of preamplifier 5 has been translated in frequency to the same frequency range assigned to preamplifier 7. Thus, the output signal of means 8 has a frequency occurring in a common frequency band of 4 to 8 kmc. regardless of which frequency region the received signal is present in.

The output of means 8 is coupled to heterodyne system 12 which will heterodyne down the signal appearing in the frequency range 4 to 8 kmc. to a suitable frequency for application to the IF amplifier 13 and, hence, to demodulator 14 to recover intelligence carried by the received signal. The output of demodulator 14 is coupled to some utilization device 15, such as a recorder or loudspeaker.

Figure 2:
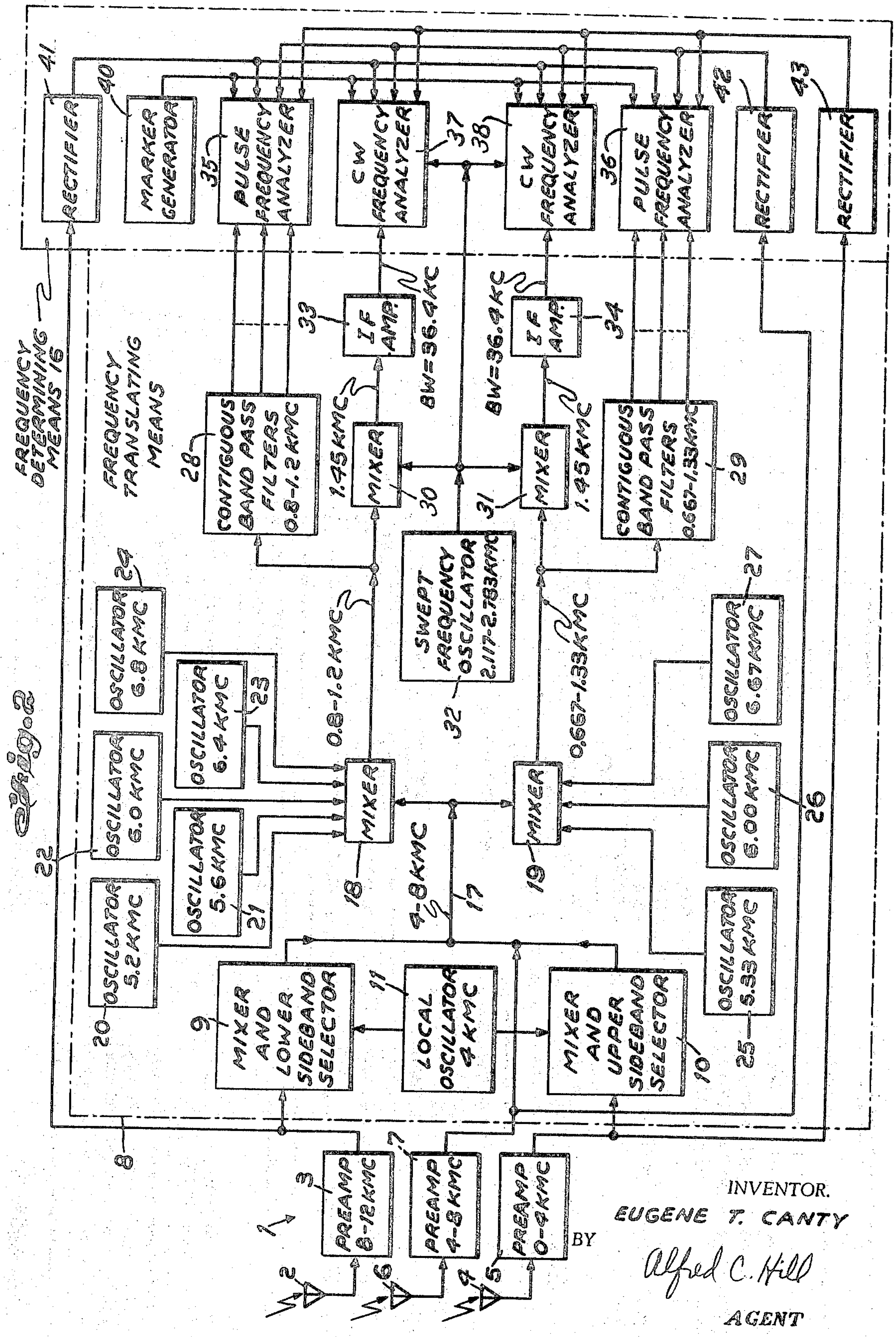
FIG. 2 is a block diagram of another embodiment of the wideband receiver in accordance with the principles of this invention.

Heterodyne system 12 may take any known form and in fact may take the form of the heterodyning arrangement in means 8 of FIG. 2 between the common output 17 and frequency determining means 16.

FIG. 2 illustrates the wideband receiver of this invention including a frequency translating or second means 8 which is particularly useful in determining the frequency of the received signal whether the signal be a pulsed or a continuous wave signal. It should be noted, however, that the frequency determining means 16 can have substituted therefor known signal demodulating arrangements for both pulsed and continuous wave signals to recover intelligence that may be conveyed by the received signal.

Equipment contained in FIG. 2 which is the same as the equipment present in FIG. 1 are identified by the same reference character. Thus, means 1 includes antenna 2 and preamplifier 3 responsive to signals in the upper frequency region 8 to 12 kmc., antenna 6 and preamplifier 7 responsive to signals in the intermediate frequency region 4 to 8 kmc., and antenna 4 and preamplifier 5 responsive to signals in the lower frequency region of 0 to 4 kmc.

The mixer and lower sideband selector 9 coupled to preamplifier 3 heterodynes or translates the frequency of the upper frequency region of 8 to 12 kmc. through cooperation of the local oscillator 11 to a common intermediate frequency band of 4 to 8 kmc. while mixer and upper sideband selector 10 through the cooperation of oscillator 11 heterodynes or translates the frequency region of preamplifier 5 to the common intermediate frequency band of 4 to 8 kmc. This is the same frequency translation described in connection with FIG. 1. The output of amplifier 7 which responds to signals in the intermediate frequency region of 4 to 8 kmc. is coupled directly to the common output 17 of this first frequency translating arrangement.

A third mixer 18 and a fourth mixer 19 are coupled to the common output 17. Five oscillators 20 through 24 are coupled to mixer 18 which will beat with any signal in the common intermediate frequency band of 4 to 8 kmc. to produce a difference signal that will fall in the frequency band of 0.8 to 1.2 kmc. at the output of mixer 18. This operation is indicated in Table I.

TABLE I

| Input to Mixer 18 in kmc. | Oscillator Input in kmc. | Output of mixer 18 in kmc. |
|---|---|---|
| 4.0 | 5.2 | 1.2 |
| 5.0 | 6.0 | 1.0 |
| 5.3 | 6.4 | 1.1 |
| 5.9 | 6.8 | 0.9 |
| 6.0 | 5.2 or 6.8 | 0.8 |
| 6.1 | 5.2 | 0.9 |
| 7.0 | 6.0 | 1.0 |
| 7.5 | 6.4 | 1.1 |
| 8.0 | 6.8 | 1.2 |

Mixer 19 has couple thereto three oscillators 25, 26 and 27 which will beat with any signal in the 4 to 8 kmc. band to produce a difference frequency at the output of mixer 19 in the 0.667 to 1.33 kmc. band. This operation is indicated in Table II.

TABLE II

| Input to mixer 19 in kmc. | Oscillator Input in kmc. | Output of mixer 19 in kmc. |
|---|---|---|
| 4.0 | 5.33 | 1.33 |
| 5.0 | 6.00 | 1.00 |
| 5.9 | 6.67 | 0.77 |
| 6.0 | 5.33 or 6.67 | 0.67 |
| 6.1 | 5.33 | 0.77 |
| 7.0 | 6.00 | 1.00 |
| 8.0 | 6.67 | 1.33 |

The two pluralities of local oscillator signals coupled to mixers 18 and 19 are illustrated as being produced by separate and distinct oscillators 20 through 24 and 25 through 27. It is to be understood that these local oscillator signals can also be produced by generating harmonics of a lower frequency oscillator, by the generation of sidebands of the frequency of the signal produced by one microwave oscillator by mixing with the frequency of the signal produced by a very high frequency oscillator, or a combination of these methods.

Means 8 additionally includes a plurality of contiguous bandpass filters 28 covering the frequency band of 0.8 to 1.2 kmc. and have their inputs coupled to the output of mixer 18. The plurality of outputs from contiguous bandpass filters 28 are coupled to frequency determining means 16. While only three output leads from filters 28 are illustrated, the vertical dotted line indicates that there can be more output leads than illustrated. The number of output leads will depend upon the number of bandpass filters needed to cover contiguously the band of 0.8 to 1.2 kmc. The number of filters required in turn depend on the sharpness of the bandpass filters, in other words, the bandwidth of the bandpass filters. The contiguous bandpass filters 28 are utilized in conjunction with pulsed signals to identify the frequency of the signal at the output of mixer 18.

In a like manner contiguous bandpass filters 29 covering the frequency range of 0.667 to 1.33 kmc. are coupled to the output mixer 19. Here again although three output leads are shown coupled to frequency determining means 16 other leads could be present depending upon the number of bandpass filters employed which of course will be determined by the bandwidth of the individual ones of bandpass filters 29. The output of an individual one of the bandpass filters 29 will give an indication of the frequency of the received signal present in the output of mixer 19.

Also the output of mixer 18 is coupled to a fifth mixer 30 and the output of mixer 19 as coupled to a sixth mixer 31, each of which has coupled in common thereto a swept frequency oscillator 32. The signal output of oscillator 32 is swept over the frequency range of 2.117 to 2.783 kmc. As the frequency of oscillator 32 is swept through its frequency range mixer 30 and mixer 31 will periodically produce an intermediate frequency output centered at 1.45 kmc. when it is beat with the signal in the frequency band at the output of mixer 18 and the output of mixer 19. Thus, there is again produced, by folding or heterodyning frequency bands, or region, an output in a common frequency band. The output of mixer 30 is coupled to IF amplifier 33 and the output of mixer 31 is coupled to IF amplifier 34. Both of IF amplifiers 33 and 34 have a bandwidth of 36.4 kc. and are in turn coupled to frequency determining means 16. The output of amplifiers 33 and 34 is useful in determining the frequency of a continuous wave signal.

Frequency determining means 16 is illustrated generally to include a pulse frequency analyzer 35 coupled to the output of bandpass filters 28 and a pulse frequency analyzer 36 coupled to the output of bandpass filters 29. These analyzers 35 and 36 may take the form of a radial display of frequency. In addition, frequency determining means 16 includes a continuous wave frequency analyzer 37 and a continuous wave frequency analyzer 38 in the form of a cathode ray panoramic display tube, each sweep of which is synchronized with the sweep of oscillator 32.

Depending upon the type of signal received the analyzers 35, 36, 37 and 38 taken individually will establish the frequency of the signal contained in the frequency region at the output of mixers 18 and 19 but does not establish the corresponding frequency of the signal in the common intermediate frequency band of 4 to 8 kmc. and, hence, the value of the frequency of the incoming signal. However, pulse signal analyzers 35 and 36 taken together narrow the corresponding frequency in the intermediate frequency band of 4 to 8 kmc. to either of two frequencies. When analyzers 37 and 38 are taken together they also narrow the frequency of the signal in the band of 4 to 8 kmc. to two values depending upon the percent of the extent of the sweep in the display tubes of analyzers 37 and 38 as illustrated in the graph of FIG. 3.

Figure 3:
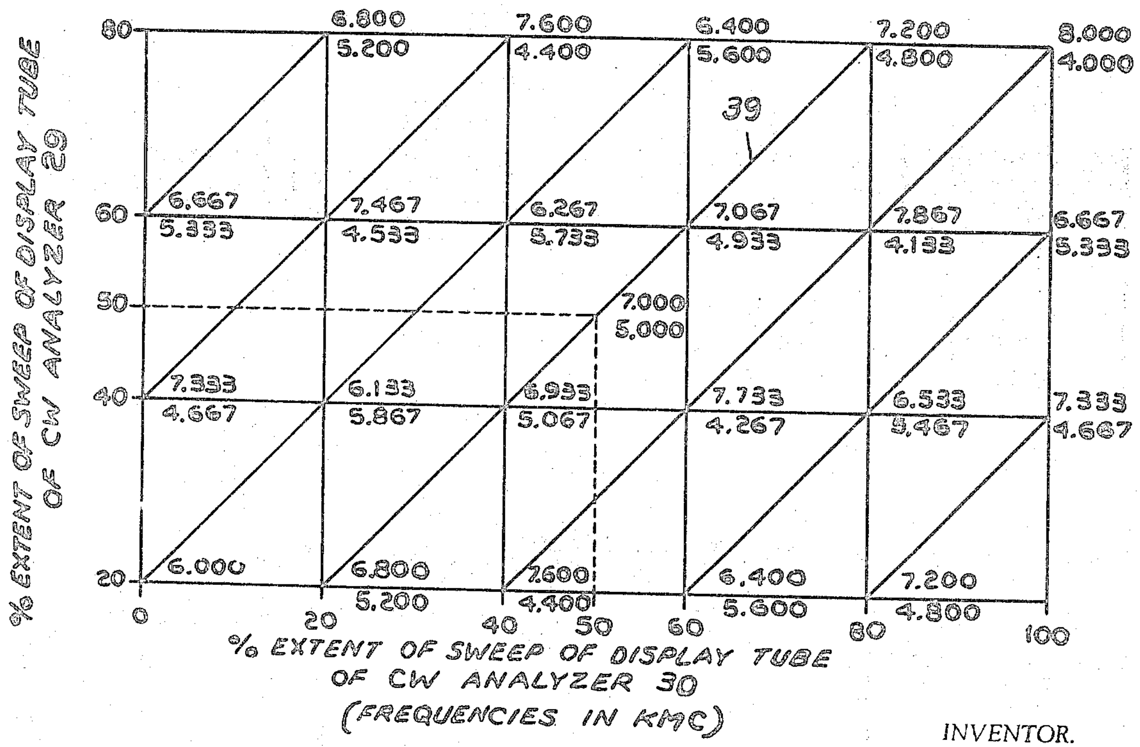
FIG. 3 is a graph useful in determining the frequency of a received signal used in conjunction with the frequency determining means of FIG. 2.

In a frequency occurs at 50 percent of the sweep of both the panoramic display tubes of analyzers 37 and 38, the graph of FIG. 3 will be entered from both coordinates at 50 percent, as indicated by the dotted lines. The dotted lines intersect on line 39 and corresponds to a frequency of 7.000 kmc. or 5.000 kmc. Thus, there appears to be an ambiguity present as illustrated in FIG. 3 and as indicated in Tables I and II above. However, by forming a suitable marker in marker generator 40, for instance, by a 6:1 divider coupled to the output of a 6 kmc. oscillator, a marker can be disposed in the display of the display tube, in a well-known manner, to indicate the position of the signal blip relative to the marker on the display tube of analyzers 37 and 38 to indicate which of the two values of the two display tubes actually are displaying. Thus, by producing the marker in marker generator 40 for *cw* frequency analysis it is possible to resolve any ambiguity that may seemingly appear between the frequency band 4 to 6 kmc. and 6 to 8 kmc. in the common or intermediate frequency band at output 17. The 6-kmc. oscillator for marker generator 40 it can be obtained from a internal oscillator (not illustrated) or may be obtained from either oscillator 22 or 26 coupled to mixers 18 and 19, respectively.

Any ambiguity that may occur in analyzers 35 and 36 of the frequency of the pulsed signals may be resolved also by the use of the marker produced by marker generator 40 where this marker produces a reference radial display on the tubes of analyzers 35 and 36.

Similarly pulse signal frequency and *cw* frequency displays of other paired values can be resolved.

Alternately, suitable selection of the frequencies of the signals of local oscillators 20 to 24 and 25 to 27 will remove the seeming ambiguity between the 4 to 6 kmc. and 6 to 8 kmc. portions of the frequency band of 4 to 8 kmc.

Having determined the value of the frequency of the received signal in the frequency band of 4 to 8 kmc., it is now necessary to determine the specific value of the actual frequency of the received signal. This is accomplished by production of suitable signals by means of rectifiers 41, 42 and 43 coupled to the output of amplifiers 3, 7 and 5, respectively. For instance, assume that, in conjunction with the marker signal of generator 40, analyzers 37 and 38, or analyzers 35 and 36, it has been determined that the signal at output 17 is 7 kmc. Then, if rectifier 41 produces an output signal, it is known that the received signal is in the frequency region of preamplifier 3. The actual frequency of the received signal is then easily determined by adding 4 kmc. to 7 kmc. to arrive at the actual frequency value of 11 kmc. On the other hand, if rectifier 42 produced an output, it would be known then that the signal is present in the frequency region of preamplifier 7 and that the frequency of the signal received is actually 7 kmc. However, if rectifier 43 produces an output it is known that the received signal is in the frequency region of preamplifier 5. By subtracting 4 kmc. from 7 kmc. it is known that the received signal has a frequency of 3 kmc. Thus, by utilizing the signals produced by rectifiers 41, 42 and 43 and the marker produced by generator 40 in conjunction with the graph of FIG. 3 there is enough information available to establish the value of the incoming carrier frequency for either a pulse or *cw* signal over the whole band encompassed by the compatible pulse and continuous wave receiver of this invention.

The wideband receiver of this invention has numerous advantages over systems of the prior art which are utilized for receiving and/or frequency measuring signals covering a wide range of frequencies. Certain of these advantages may be summarized as follows:

(1) The frequency folding or heterodyning taking place at mixers 9, 10 and local oscillator 11 to fold their frequency regions into the common frequency region of preamplifier 7 reduces the required number of swept frequency local oscillators to zero; (2) The coarse frequency measurement at the output 17 reduces the number of frequency determining filter units which are required for radio frequency measurements of pulse signals; (3) The heterodyning or frequency folding to produce the common output of mixers 18 and 19 permits fine frequency measurement on pulse signals in a wide open fashion by means of filters 28 and 29 and spectral resolution of continuous wave signals with a swept frequency oscillator; (4) Crystal video rectifiers are utilized to simply resolve ambiguities of frequency measurements and to extend the dynamic range of reception of pulse signals to about an 80 decibel range; (5) Digital and analog methods of resolution of frequency of pulse signals and the simultaneous reception of pulse signals without confusion may be made available in the present receiver; and (6) Integration of wide open and swept frequency functions at a UHF frequency for improved performance in the high-density environment and/or with complex emissions permits use of common front end channels for pulsed and continuous wave signals and for signals of a wide frequency range thereby affording equipment economies.

While I have described above the principles of my invention in connection with specific apparatus and examples, it is to be clearly understood that this description is made only by way of example and not as a limitation to the scope of my invention as set forth in the objects thereof and in the accompanying claims.

I claim:

1. A wideband receiver having a given frequency range for reception of signals disposed therein comprising:
   first means to divide said given frequency range into a first frequency region and a plurality of frequency regions different from each other and said first frequency region, said first and said plurality of frequency regions being contiguous; and
   second means coupled to said first means to frequency translate said plurality of frequency regions into said first frequency region.

2. A receiver according to claim 1, further including
   mean coupled to said second means to recover intelligence conveyed by said received signals.

3. A receiver according to claim 1, further including
   means coupled to said second means to determine the frequency of said received signals.

4. A receiver according to claim 1, wherein
   said given frequency range is divided into three different, contiguous frequency regions;
   said first means includes
      a first amplifier responsive to signals in the higher one of said frequency regions,
      a second amplifier responsive to signals in the lower one of said frequency regions, and
      a third amplifier responsive to signals in the intermediate one of said frequency regions; and
   said second means includes
      a frequency translator arrangement coupled to said first and second amplifiers to frequency translate said higher and lower ones of said frequency regions to said intermediate one of said frequency regions 5. A wideband receiver having a given frequency range for reception of signals disposed therein comprising:
   first means to divide said given range into a plurality of different, contiguous frequency regions; and
   second means coupled to said first means to frequency translate said plurality of frequency regions into a common frequency band;
   said given frequency range being divided into three different, contiguous frequency bands;
   said first means including
      a first amplifier responsive to signals in the higher one of said frequency regions,
      a second amplifier responsive to signals in the lower one of said frequency regions, and
      a third amplifier responsive to signals in the intermediate one of said frequency regions;
   and said second means including
      an arrangement coupled to said first and third amplifiers to frequency translate said higher one of said frequency regions and said lower one of said frequency regions to said intermediate one of said frequency regions.

6. A receiver according to claim 5, wherein
   said second means further includes
      means coupled in common to said arrangement and said third amplifier.

7. A wideband receiver having a given frequency range for reception of signals disposed therein comprising:

first means to divide said given frequency range into a plurality of different, contiguous frequency regions; and second means coupled to said first means to frequency translate said frequency regions into a common frequency band;

said given frequency range being divided into three different, contiguous frequency regions;

said first means including a first amplifier responsive to signals in the higher one of said frequency regions, a second amplifier responsive to signals in the lower one of said frequency regions, and a third amplifier responsive to signals in the intermediate one of said frequency regions; and said second means including a first mixer coupled to said first amplifier, a second mixer coupled to said second amplifier, and a first oscillator coupled in common to said first and second mixer, said first mixer including a lower sideband selector to define said intermediate one of said frequency regions, said second mixer including an upper sideband selector to define said intermediate one of said frequency regions.

8. A receiver according to claim 7, further including means coupled in common to said first and second mixers and said third amplifier to recover intelligence conveyed by said received signals.

9. A receiver according to claim 7, wherein said second means further includes a third mixer coupled in common to said first and second mixers and said third amplifier, a first source of a plurality of signals coupled to said third mixer to define at the output of said third mixer a first frequency band different than said intermediate one of said frequency regions, a fourth mixer coupled in common to said first and second mixers and said third amplifier, a second source of a plurality of signals coupled to said fourth mixer to define at the output of said third mixer a second frequency band different than said intermediate one of said frequency regions and said first frequency band, a first plurality of contiguous pass-band filters coupled to said third mixer to indicate the portion of said first frequency band containing said received signal, a second plurality of contiguous pass-band filters coupled to said fourth mixer to indicate the portion of said second frequency band containing said received signal, a fifth mixer coupled to said third mixer, a sixth mixer coupled to said fourth mixer, and a second oscillator coupled in common to said fifth and sixth mixer to define at the output of each of said fifth and sixth mixer a third frequency band different than said first and second frequency bands and said intermediate one of said frequency regions.

10. A receiver according to claim 9, further including means coupled to said first and second plurality of contiguous pass-band filters, said second oscillator, said fifth and sixth mixers, and said first, second and third amplifiers to determine the frequency of said received signals.

* * * * *